United States Patent
Desai (10) Patent No.: US 10,601,265 B2
(45) Date of Patent: Mar. 24, 2020

(54) STATOR FOR A MULTIPHASE ELECTRIC MOTOR, METHOD FOR PRODUCING A COIL WINDING, AND ELECTRIC MOTOR FOR A HANDHELD TOOL

(71) Applicant: Robert Bosch GmbH, Stuttgart (DE)

(72) Inventor: Michael Palsule Desai, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 104 days.

(21) Appl. No.: 15/832,481

(22) Filed: Dec. 5, 2017

(65) Prior Publication Data

US 2018/0166932 A1 Jun. 14, 2018

(30) Foreign Application Priority Data

Dec. 8, 2016 (DE) .................. 10 2016 224 425

(51) Int. Cl.
| | |
|---|---|
| *G04C 13/11* | (2006.01) |
| *H02K 37/00* | (2006.01) |
| *H02K 1/14* | (2006.01) |
| *H02K 3/46* | (2006.01) |
| *H02K 11/33* | (2016.01) |
| *H02K 7/14* | (2006.01) |
| *H02K 3/50* | (2006.01) |
| *H02K 3/28* | (2006.01) |

(52) U.S. Cl.
CPC .............. *H02K 1/14* (2013.01); *H02K 1/148* (2013.01); *H02K 3/28* (2013.01); *H02K 3/46* (2013.01); *H02K 3/50* (2013.01); *H02K 7/145* (2013.01); *H02K 11/33* (2016.01)

(58) Field of Classification Search
CPC .......... H02K 11/33; H02K 1/14; H02K 1/148; H02K 3/28; H02K 3/46; H02K 3/50; H02K 7/145
See application file for complete search history.

(56) References Cited

U.S. PATENT DOCUMENTS

| | | | | |
|---|---|---|---|---|
| 4,127,787 A | * | 11/1978 | Auinger | H02K 3/28 310/184 |
| 6,359,361 B1 | * | 3/2002 | Wakui | H02K 3/28 310/179 |

(Continued)

FOREIGN PATENT DOCUMENTS

EP 2849316 A2 3/2015

*Primary Examiner* — Yuriy Semenenko
(74) *Attorney, Agent, or Firm* — Norton Rose Fulbright US LLP; Gerard Messina (57) ABSTRACT

A stator is provided for a multiphase electric motor. The stator has a stator core having a multiplicity of stator teeth situated along a circumference of the stator core, coils wound on the stator teeth, and a multiplicity of connecting terminals for contacting the electric motor in a delta connection, with a parallel circuit of the coils per phase. Here, a respective winding wire of the coils is connected directly to the connecting terminal at each connecting terminal. In addition, a multiplicity of coils is connected in parallel to at least one of the connecting terminals, and the connecting terminals are provided for at least one of the phases in each case as a terminal pair made up of a main terminal and a secondary terminal connected to the main terminal by an electrically conductive connecting piece. In addition, an associated winding method is described.

12 Claims, 6 Drawing Sheets

(56) References Cited

U.S. PATENT DOCUMENTS

| | | | |
|---|---|---|---|
| 6,993,829 B2* | 2/2006 | Kobayashi | H02K 15/0056 29/596 |
| 10,256,682 B2* | 4/2019 | Wang | H02K 1/165 |
| 2007/0296292 A1* | 12/2007 | Kienzler | H02K 3/522 310/71 |
| 2008/0088196 A1* | 4/2008 | Takahashi | H02K 3/28 310/198 |
| 2009/0200879 A1* | 8/2009 | Ghodsi-Khameneh | H02K 3/28 310/71 |
| 2013/0328425 A1* | 12/2013 | Tomita | H02K 11/0094 310/71 |
| 2015/0069864 A1* | 3/2015 | Nagahama | H02K 29/08 310/50 |

* cited by examiner

STATOR FOR A MULTIPHASE ELECTRIC MOTOR, METHOD FOR PRODUCING A COIL WINDING, AND ELECTRIC MOTOR FOR A HANDHELD TOOL

CROSS REFERENCE

The present application claims the benefit under 35 U.S.C. § 119 of German Patent Application No. DE 102016224425.6 filed on Dec. 8, 2016, which is expressly incorporated herein by reference in its entirety.

FIELD

The present invention relates to a stator for a multiphase electric motor. In addition, the present invention relates to a method for producing a coil winding having a plurality of concentrated stator coils connected in parallel for a multiphase electric motor, and to a corresponding electric motor for a handheld tool.

BACKGROUND INFORMATION

Electric tools such as cordless screwdrivers are constantly being further developed and optimized with regard to the needs of the user, and in particular easy handling and, often, a compact design are sought. At the same time, the electric motor built into the electric tool should adequately meet demands regarding power and torque resulting from particular applications. These facts present challenges for product design and the selection of a suitable production process.

A typical electric motor for an electric tool standardly has a stator having coil windings and a three-phase terminal. A maximally efficient coil winding of the electric motor is to be provided, a pin winding method typically being used. In standard stator coils, only a low number of windings is required due to high rotation numbers. In order to fill the group surface with as much copper as possible given the relatively low number of windings, the copper wire diameter increases. However, the possible wire diameter is limited by the pin winding process. Furthermore, the number of windings decreases when all coils of a phase are connected in series, because in this case the induced voltages would sum. For this reason, a parallel connection of the coils is preferred. Due to the reduced wire diameter in the case of a parallel connection, a more advantageous winding topology can be realized with which the groove can be maximally filled.

European Patent No. EP 2849316 A2 describes an electric motor for an electric tool that has, for each phase terminal, a multiplicity of coils connected in parallel, and has the same number of connection terminals for the coils, the connection terminals being connected to the external line terminals through a multiplicity of wiring layers, by a circuit board and connecting pieces.

Thus, there is a need to provide a winding schema for concentrated coils, connected in parallel, of an electric motor, in particular for an electric tool, in which production is simplified and costs are saved.

SUMMARY

A stator is provided for a multiphase electric motor, and an associated method is provided for producing a coil winding having a plurality of stator coils connected in parallel, and an electric tool is also provided.

Preferred developments of the present invention are described herein.

According to an aspect of the present invention, a stator is provided for a multiphase electric motor. The stator has a stator core having a multiplicity of stator teeth situated along a circumference of the stator core, stator coils wound on the stator teeth, and a plurality of connecting terminals for contacting the electric motor in a delta connection, with a parallel circuit of the stator coils per phase. At each connecting terminal, a respective winding wire of the stator coils is connected directly to the connecting terminal, and a plurality of coil ends are connected in parallel to at least one of the connecting terminals. In addition, for at least one of the phases the connecting terminals each have a terminal pair made up of a main terminal and an additional terminal, connected to the main terminal by an electrically conductive connecting piece.

According to another aspect of the present invention, a method is provided for producing a coil winding having a plurality of concentrated stator coils connected in parallel for a multiphase electric motor. Here, the stator coils are wound in series, and in the winding of a coil the winding wire is guided in each case from the respective stator tooth to a connecting terminal, and from the connecting terminal to a next stator tooth, until all the stator teeth are wound. In addition, the winding wire is electrically contacted to the connecting terminals. Here, the winding wire is wound on connecting terminals that have a terminal pair of a first connecting terminal and a second connecting terminal that are connected to one another in electrically conductive fashion, the winding wire being multiply guided to the first connecting terminal.

According to another aspect, an electric motor is provided for a handheld tool having an electric multiphase motor that has a stator according to the present invention.

In particular, less soldering or connection is required, because, compared to the existing art, significantly fewer wires have to be soldered to the terminals. Due to the specific guiding of the winding wire, a configuration of the terminals is enabled in which the terminals are no longer molded in plastic, and in particular one layer of the circuit board can be omitted. According to a preferred specific embodiment, two of the phases of the electric motor are each equipped with a terminal pair, the coils of the third phase being assigned to an individual one of the connecting terminals to which the associated coil ends are connected in parallel.

Here, for the first phase and the second phase the winding wire can in each case be guided twice to the respective secondary terminal and wants to the respective main terminal, and for the third phase the winding wire can be guided three times to the fifth terminal.

With this combination, the design can be kept particularly simple compared to a configuration having further additional terminals that would again have to be connected electrically to the main terminals, which would cause a problematic situation and would require printed conductors on a plurality of layers.

Here, the stator coils can have nine concentrated coils having three coils per phase, the connecting terminals being configured with an angular distance of around 120° between the connecting terminals of a terminal pair, and otherwise with an angular distance of around 40°, no connecting terminal being situated between a terminal pair.

Preferably, the connecting terminals are distributed at predetermined distances from one another along a circumferential circle that is situated concentrically to the stator core.

According to another advantageous specific embodiment, a main terminal and a secondary terminal of each terminal pair are situated directly adjacent to one another with a specified distance.

Here, the connecting terminal of the third phase can be situated between two configurations of a respective terminal pair.

According to a specific embodiment, the connecting piece of a terminal pair can in each case be realized as a plate situated on the stator core.

In addition, the main terminal and the secondary terminal can be made in one piece with the connecting piece.

Here, in the assembled state of the stator, the main terminal and the secondary terminal can be bent upward, perpendicular relative to the connecting piece.

According to a particularly advantageous specific embodiment, all connecting terminals, in particular the connecting terminals of a terminal pair, are constructed in the same way.

In this way, a large portion of common parts in the electric motor can be achieved.

In addition, a winding wire can be connected to a connecting terminal by welding or soldering.

Preferably, the connecting terminals each have a hook for guiding winding wire past.

According to a preferred specific embodiment, the stator has in addition an insulating piece that is attached on an end face of the stator core, the insulating piece having a part that runs in circular fashion and a plurality of parts situated on the stator teeth and extending through the coils.

Here, the part that runs in circular fashion can be equipped with receiving regions for guiding through the connecting terminals.

The receiving regions can be situated respectively in an angular region between two stator teeth.

According to a specific embodiment, the stator coils are situated on the inner circumference of the stator core, the connecting terminals being situated on the end face of the stator core radially between its inner circumference and outer circumference.

Preferably, when being guided past a connecting terminal, the winding wire is guided in each case behind the connecting terminal, seen from the direction of the stator teeth.

Here, the insulating piece can be provided with a raised area, and/or a groove for guiding the wire, at positions between the stator teeth at which no connecting terminal is fashioned.

According to a specific embodiment, when guiding the winding wire to a next connecting terminal, if the connecting terminal is not situated directly within the angular interval to the next stator tooth, the winding wire is guided past a wire guiding region and/or another connecting terminal.

BRIEF DESCRIPTION OF THE DRAWINGS

Preferred specific embodiments of the present invention are explained in more detail below on the basis of the figures.

DETAILED DESCRIPTION OF EXAMPLE EMBODIMENTS

Figure 1:
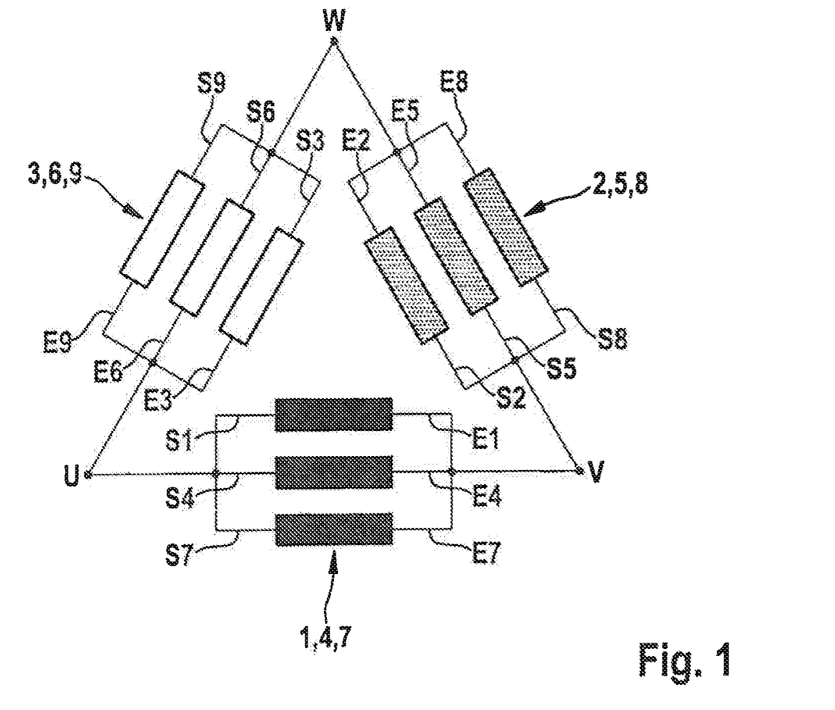
FIG. 1 shows a schematic wiring diagram of a typical delta connection for controlling a plurality of coils connected in parallel per phase.

FIG. 1 shows a schematic wiring diagram of a delta connection for controlling a plurality of coils connected in parallel per phase. Here, coils 1 through 9 are connected in three groups, each having three coils, in each case between two of the connecting terminals V, U, and W. The pin winding for producing the coil windings is intrinsically suitable for winding the coils in series.

The actual parallel connection of the individual coils is then realized via an additional component, called a circuit board in the following, which correspondingly connects the open ends to one another. The circuit board requires a plurality of printed conductor layers. For example, if there are three phases, each third beginning wire and end wire of a coil must be connected to one another. Thus, when there are three phases, and in each case two coils that are to be connected in parallel, the circuit board must have at least two layers.

Figure 2:
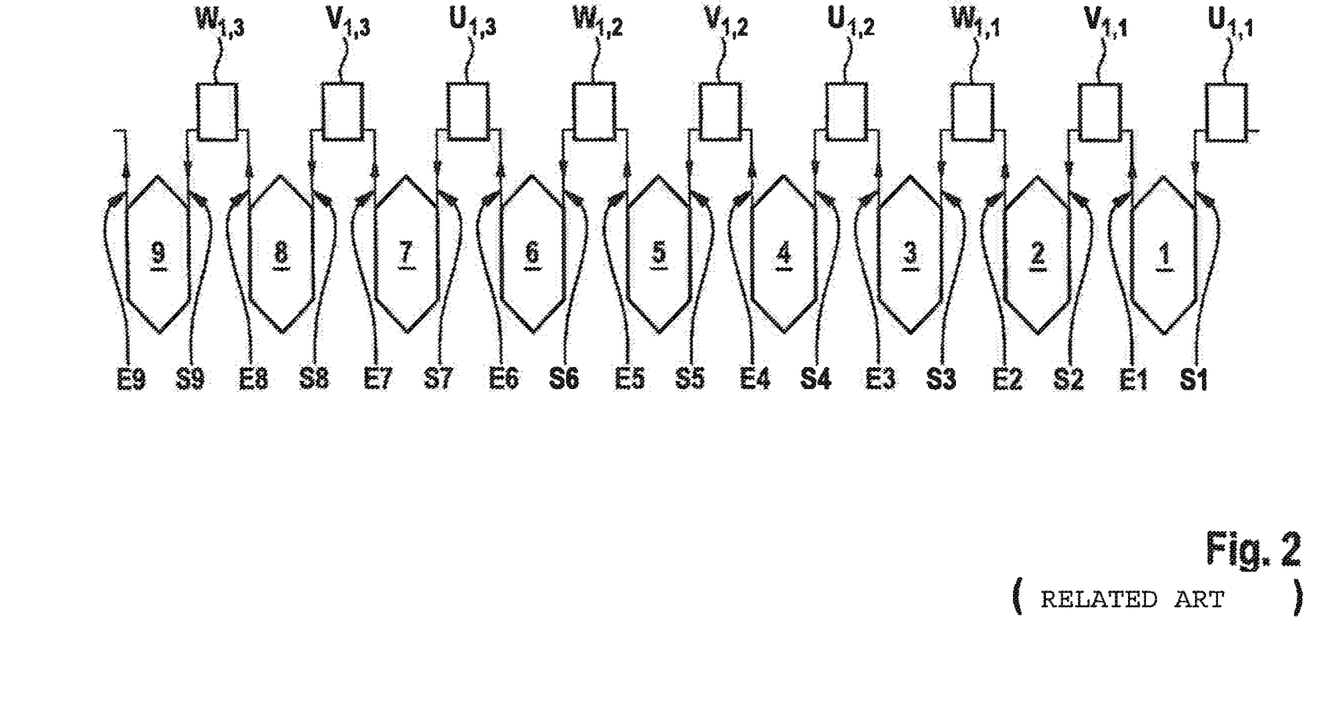
FIG. 2 shows a winding schema for connecting coil terminals to a circuit board according to the related art.

FIG. 2 shows a conventional winding schema for a connection to a circuit board. Because all coils 1 through 9 are to be connected in parallel, the terminals have to be electrically conductively connected to the main terminals through a circuit board. Thus, coils 1 through 9 are electrically connected via terminals U1,1 to U1,3, V1,1 to V1,3, and W1,1 to W1,3 through a circuit board, which has to run on different layers due to geometrical crossings.

Figure 3:
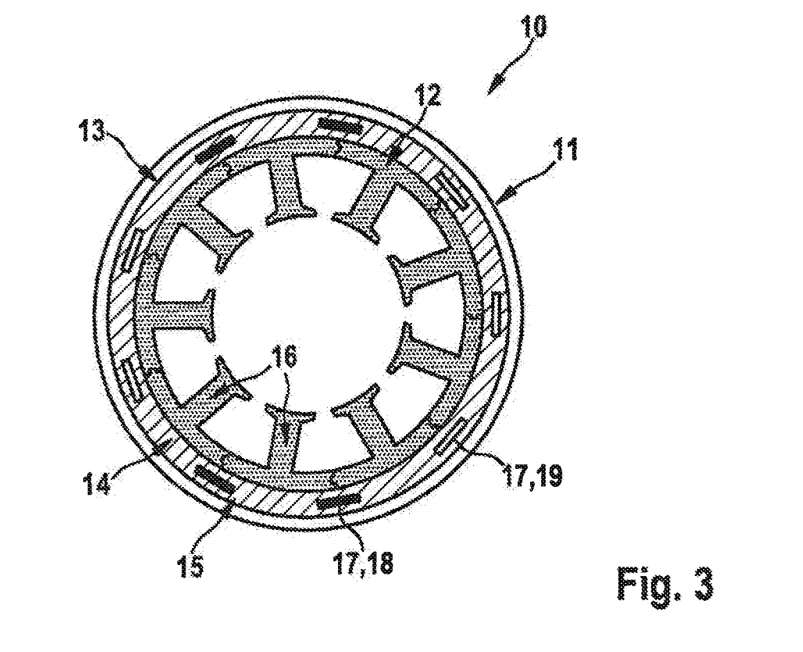
FIG. 3 shows a schematic top view of a stator according to a specific embodiment of the present invention.

FIG. 3 shows a simple schematic top view of a stator 10 according to a specific embodiment of the present invention. Stator 10 has a stator core 11 having nine stator teeth 12, only one of the stator teeth 12 being provided with a reference character in the figure for the sake of clarity. Stator 11 is provided on its end face 13 with an insulating piece 14, in particular made in one piece. Insulating piece 14 has a part 15 that runs in a circular fashion. In addition, the insulating piece has a plurality (here nine) of parts 16 that extend over stator teeth 12 and are therefore also wound over when the winding with wire takes place. Insulating piece 14 is provided with a plurality (here nine) of raised areas 17. Raised areas 17 can be formed as a simple raised area 18, or can be made with a hole or receptacle 19 for guiding through a terminal.

Figure 4:
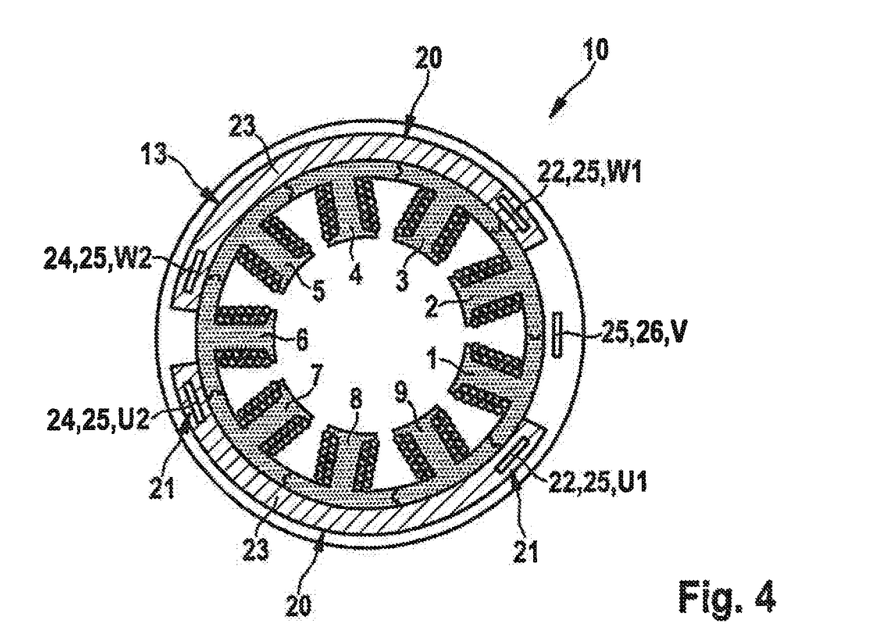
FIG. 4 shows a schematic top view of a stator provided with configurations of connected terminal pairs according to a specific embodiment of the present invention.

FIG. 4 shows a simple schematic top view of a stator 10 that is equipped with configurations 20 each having a terminal pair 21 made up of a main terminal 22 and a secondary terminal 24, electrically connected to main terminal 22 by a connecting piece 23, according to a specific embodiment of the present invention. FIG. 4 also shows coil windings 1 through 9. Here, connecting terminal 26 is fashioned as a single terminal 25, and connecting terminals 22, 24 are each configured in a terminal pair 21 as mentioned above. In comparison to FIG. 3, part 15, which runs in circular fashion, of insulating piece 14 is not explicitly shown in FIG. 4. In addition, the connecting wires, i.e. the parts of the winding wire outside coils 1 through 9, are not shown, for clarity. Instead, these are explained below on the basis of the following Figures.

Stator 10 shown above as an example corresponds to a three-phase stator having nine grooves. Per phase, three concentrated windings are connected in parallel.

Connecting terminal 26 can be designated below as a V terminal, and terminals 24 can for example correspond to a W2 terminal or a U2 terminal, and terminals 22 can for example correspond to a W1 terminal or a U1 terminal.

Figure 5:
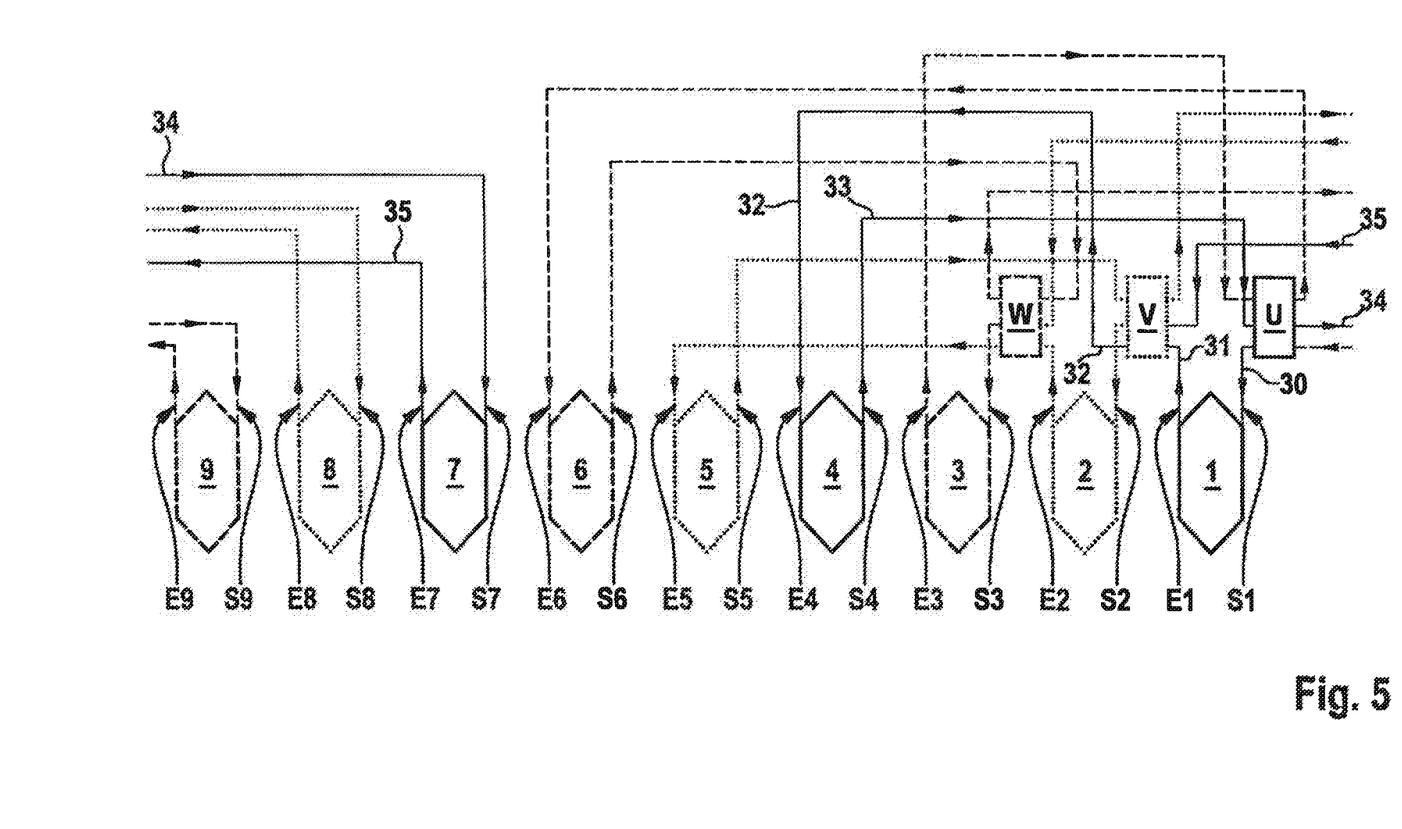
FIG. 5 shows a connection of nine coils in a phase-by-phase parallel configuration, having three terminals.

FIG. 5 shows a connection of coils 1 through 9 in a parallel configuration having only three terminals U, W, V. Here, similar to FIG. 2, the respective coil ends or coil beginnings are designated with reference characters E1 to E9 or, respectively, S1 to S9. The winding wires, or winding wire segments, are each shown by continuous, dashed, or dotted lines. Because in this comparative example, in contrast to the specific embodiments of the present invention, only one terminal is used per phase, there results a non-uniform wiring outlay for contacting coils 1 through 9 with terminals U, W, V. Coils 1 through 9, here shown schematically by the hexagonal box, are shown configured next to one another in the drawing for simplicity of representation, whereas the actual stator is circular, as is shown in FIG. 3 and FIG. 4. In the drawing, the winding wires are shown by continuous, dashed, or dotted lines, depending on to which phase U, W, V the respective coil 1 through 9, or the respective winding wire, is assigned.

As is shown in FIG. 5, the course of the winding wire begins for example at terminal U, winding wire segment 30 connecting terminal U to the beginning S1 of coil 1. In the drawing, the current direction of the course of the wire through the pin winding machine is indicated in each case by an arrow on the basis of which the course of the wire can be followed. The winding wire then forms coil 1. The winding wire then leaves coil 1 at coil end E1. The winding wire then forms first winding wire segment 31, which connects coil 1 with terminal V. There, the winding wire is connected to terminal V, for example by soldering or welding. Winding wire segment 32 further forms the connection between terminal V and coil beginning S4 of coil 4. The winding wire then forms coil 4, and, in its further course, in winding wire segment 33 is guided from coil end E4 back to terminal U. In order to continue the winding, here, as in coil 5 and 6 as well, the direction of winding of the winding wire changes. The coil beginning is now situated to the right of the coil. Through this change in winding direction, the complexity of the winding is further increased. The winding wire is again connected to terminal U. The winding wire is then guided, in winding wire segment 34, from terminal U to coil beginning S7 of coil 7. There the winding wire is wound in order to form coil 7. The winding wire then runs, in winding wire segment 35, from coil end E7 of the coil back to terminal V and is there connected to terminal V. Thus, the winding wire is to be guided by the pin winding machine from terminal U to terminal V, to terminal U, and back to terminal V, a coil 1, 4, 7 being formed three times between the terminals U and V. In this way, a parallel connection of three coils is achieved between the terminals or phase terminals U and V. The same is repeated analogously for coils 2, 5, 8 between terminals V and W; here coils 2, 5, 8 and the associated winding wire segments, which here are no longer explicitly provided with reference characters for the sake of clarity, are each shown in dotted lines. The same holds analogously for coils 3, 6, 9 and for the associated winding wire segments, which are here shown in dashed lines to distinguish them.

As can be seen in FIG. 5, the pin with the wire always has to go back to the respective terminal. This has the disadvantage that a large number of wires have to be laid in the vicinity of terminals U, V, W. As can be seen in FIG. 5, without the additional terminals described above the pin would always have to go back to the same terminal. This would have the result that the printed conductors are not uniformly distributed. Thus, the carriers, i.e., the plastic tabs or raised regions around which the printed conductors are laid, would have to be correspondingly enlarged and made more stable mechanically.

Figure 6:
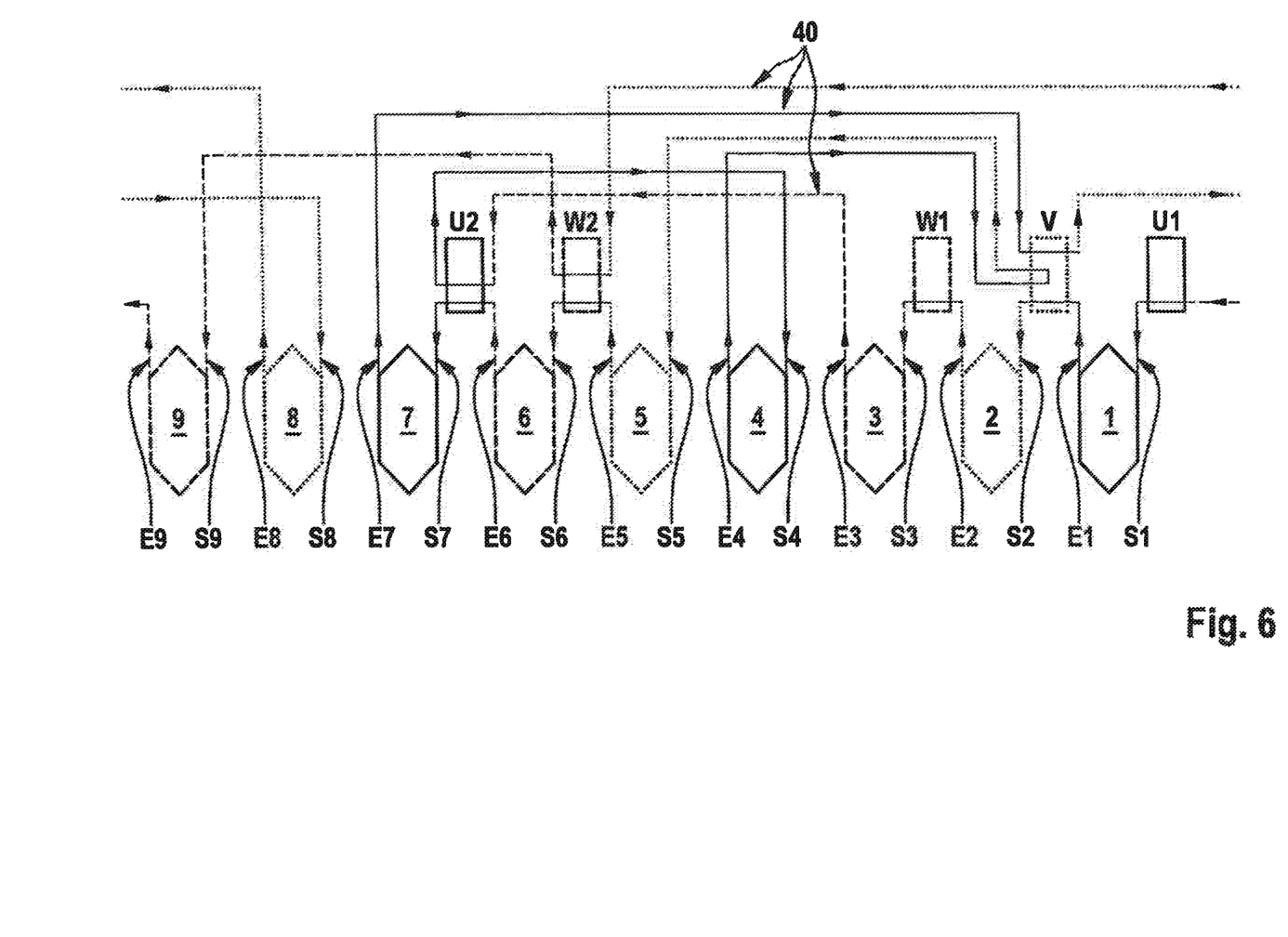
FIG. 6 shows a possible connection of the connecting terminals according to a specific embodiment of the present invention.

FIG. 6 shows a possible wiring configuration according to which the pin winding machine can equip stator 10 with coils, according to a specific embodiment of the present invention. In this specific embodiment, it is assumed that the coils are realized as concentrated coils each wound on a dedicated tooth 12. In principle there are several possibilities for the way in which the pin winding machine approaches each of the five terminals. According to the specific embodiment shown here as an example, winding wire 40 is connected to terminal U1, for example by soldering or welding. Winding wire 40 is guided from U1 to S1, and coil 1 is then wound. Winding wire 40 is then led from E1 to terminal V, and is connected to terminal V. Winding wire 40 is then led from terminal V to S2, and coil 2 is then wound. Winding wire 40 is then led from E2 to terminal W1 and is connected to terminal W1. Winding wire 40 is then led from terminal W1 to S3 and coil 3 is then wound. Winding wire 40 is then led from E3 to terminal U2 and is connected to terminal U2. Winding wire 40 is then led from terminal U2 to S3 and coil 4 is then wound. Winding wire 40 is then led from E4 to terminal V and is connected to terminal V. Winding wire 40 is then led from terminal V to S5, and coil 5 is then wound. Winding wire 40 is then led from E5 to terminal W2 and is connected to terminal W2. Winding wire 40 is then led from terminal W2 to S6 and coil 6 is then wound. Winding wire 40 is then led from E6 to terminal U2 and is connected to terminal U2. Winding wire 40 is then led from terminal U2 to S7, and coil 7 is then wound. Winding wire 40 is then led from E7 to terminal V, and is connected to terminal V. Winding wire 40 is then led from terminal V to S8 and coil 8 is then wound. Winding wire 40 is then led from E8 to terminal W2 and is connected to terminal W2. Winding wire 40 is then led from terminal W2 to S9 and coil 9 is then wound. Winding wire 40 is then led from E9 to terminal U1 and is connected to terminal U2.

For the selected topology, it is thus possible to connect two additional terminals 24 or U1, W1 to a circuit board over 120°, under the assumption that these circuit boards are to lie only in one layer. The two additional terminals 24 or U1, W1 are provided with hooks. Accordingly, there are two further points of approach that the pin winding machine can use to lay the wires.

The winding sequence shown in FIG. 6 is summarized in Table 1. As is shown in FIG. 6, the winding wire runs three times through connecting terminal V, a coil end of coil 1 and a coil beginning of coil 2 for example being connected to terminal V. The arrow in the drawing indicates in each case the direction of winding or the direction of the laying of the wire. A wire running through the respective terminal V, U1, U2, W1, W2 in the drawing here indicates that the winding wire is electrically contacted at this point to the respective connecting terminal, for example by soldering or welding. According to the method shown here, the winding wire can be wound in series for the entire stator in one piece. Different phases are shown in the drawing by different types of lines. Thus, as explained above, a continuous line indicates that a U phase connection, or a U-V phase, is present, a dotted line indicates a V phase terminal or a V-W phase, and a dashed line indicates a W phase terminal or a W-U phase. In this way, a parallel circuit can be achieved.

TABLE 1

| Sequence | Coil end | Coil beginning |
|---|---|---|
| 1 |  | U1 |
| 2 | 9 | 1 |
| 3 |  | V |
| 4 | 1 | 2 |
| 5 |  | W1 |
| 6 | 2 | 3 |
| 7 |  | U2 |
| 8 | 3 | 4 |
| 9 |  | V |
| 10 | 4 | 5 |
| 11 |  | W2 |
| 12 | 5 | 6 |
| 13 |  | U2 |
| 14 | 6 | 7 |
| 15 |  | V |
| 16 | 7 | 8 |
| 17 |  | W2 |
| 18 | 8 | 9 |
| 19 |  | U1 |

As can also be seen from FIG. 6, the wire runs multiple times not through connecting terminals V, U1, U2, W1, W2, but rather past them at the rear. With respect to stator 10 shown above, this means that if, during the guiding of the winding wire to a next connecting terminal 25, if connecting terminal 25 is not situated directly within the angular distance to the next stator tooth 12, the winding wire is led past a wire guide region and/or past another connecting terminal. For this purpose, the terminals are provided with hooks, as explained above.

Figure 7:
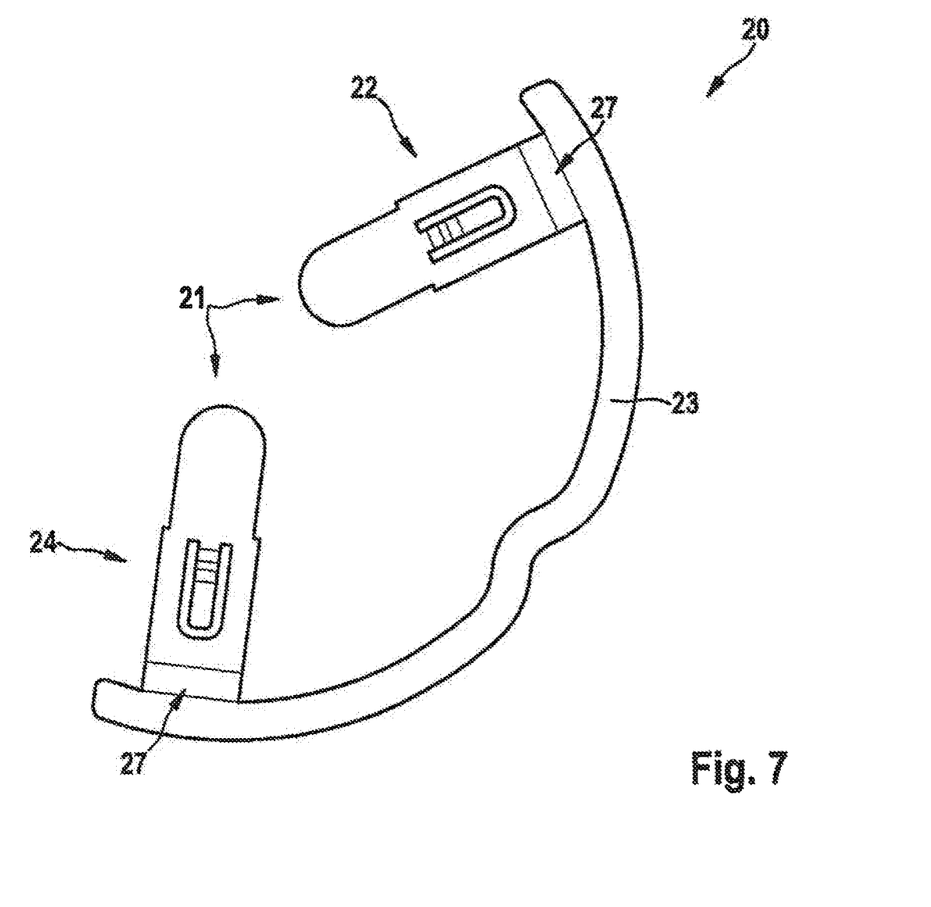
FIG. 7 shows a schematic diagram of a possible component for a terminal pair according to a specific embodiment of the present invention.

FIG. 7 shows a possible realization of a configuration or component 20 having a terminal pair 21 made up of a main terminal 22 and a secondary terminal 24 connected electrically to the main terminal 22 by a connecting piece 23. FIG. 7 shows clearly that the terminal pair is made symmetrical in order to achieve a high portion of common parts. For assembly to stator 10, terminals 22, 24 are each bent in regions 27.

What is claimed is:

1. A stator for a multiphase electric motor, comprising:
   a stator core having a multiplicity of stator teeth situated along a circumference of the stator core;
   coils wound on the stator teeth; and
   a multiplicity of connecting terminals for contacting the electric motor in a delta connection with a parallel circuit of the coils per phase, a respective winding wire of the coils being connected directly to the connecting terminal at each connecting terminal, a multiplicity of the coils being electrically connected to at least one of the connecting terminals for the connection in parallel of the relevant coils, and the connecting terminals being provided for at least one of the phases respectively as a terminal pair made up of a main terminal and an additional terminal connected to the main terminal by an electrically conductive connecting piece.

2. The stator as recited in claim 1, wherein two of the phases being equipped with a respective pair of the connecting terminals, the coils of a third phase being assigned to an individual one of the connecting terminals, to which relevant coil ends and coil beginnings are connected in parallel.

3. The stator as recited in claim 2, wherein two of the coils of the relevant phase are respectively electrically connected to a respective secondary terminal of a terminal pair.

4. The stator as recited in claim 1, wherein the connecting terminals are distributed with specified distances from one another along a circumferential circle situated concentrically to the stator core.

5. The stator as recited in claim 1, wherein the additional terminal is a secondary terminal, and wherein the main terminal and the secondary terminal of each terminal pair are situated directly adjacent to one another with a specified distance, and the connecting terminal of the third phase being situated between two configurations of a respective terminal pair.

6. The stator as recited in claim 1, wherein the connecting piece of the terminal pair is formed in each case as a plate that is situated on the stator core, the main terminal and the secondary terminal being formed in one piece with the connecting piece and being bent upward perpendicularly relative to the connecting piece.

7. The stator as recited in claim 1, wherein the connecting terminals of a terminal pair, being of the same design.

8. The stator as recited in claim 1, wherein each winding wire is connected to its respective connecting terminal by welding or soldering, and the connecting terminals having a hook for guiding winding wire past the connecting terminal.

9. The stator as recited in claim 1, further comprising:
   an insulating piece attached on an end face of the stator core, the insulating piece having a part that runs in a circular path and having parts situated on the stator teeth and extending through the coils, the part running in a circular path being equipped with receiving regions for guiding through the connecting terminals, the receiving regions each being situated in an angular region between two stator teeth.

10. The stator as recited in claim 8, wherein the coils are situated on the inner circumference of the stator core, the connecting terminals being situated on the end face of the stator core, radially between its inner circumference and outer circumference, and the winding wire, when being led past a connecting terminal, being guided along behind the connecting terminal, seen in each case from the direction of the stator teeth, and the insulating piece being provided with at least one of a raised area and a groove for wire guiding at positions between the stator teeth at which no connecting terminal is formed.

11. The stator as recited in claim 1, wherein the coils include nine concentrated coils having three coils per phase, the connecting terminals being configured with a mutual angular spacing of 120° between the connecting terminals of a terminal pair and otherwise with 40° of angular spacing, no connecting terminal being situated between a terminal pair.

12. An electric motor for a handheld tool having a stator, the stator comprising:
   a stator core having a multiplicity of stator teeth situated along a circumference of the stator core;
   coils wound on the stator teeth; and
   a multiplicity of connecting terminals for contacting the electric motor in a delta connection with a parallel circuit of the coils per phase, a respective winding wire of the coils being connected directly to the connecting terminal at each connecting terminal, a multiplicity of the coils being electrically connected to at least one of the connecting terminals for the connection in parallel of the relevant coils, and the connecting terminals being provided for at least one of the phases respectively as a terminal pair made up of a main terminal and an additional terminal connected to the main terminal by an electrically conductive connecting piece.

\* \* \* \* \*